United States Patent
Margel et al.

(10) Patent No.: US 11,436,358 B2
(45) Date of Patent: Sep. 6, 2022

(54) DATA BASED WEB APPLICATION FIREWALL

(71) Applicant: Imperva, Inc., Redwood City, CA (US)

(72) Inventors: Shiri Margel, Petach-Tikva (IL); Itsik Mantin, Shoham (IL); Amichai Shulman, Tel-Aviv (IL); Daniella Goihman-Shuster, Rishon-Lezion (IL)

(73) Assignee: Imperva, Inc., San Mateo, CA (US)

( * ) Notice: Subject to any disclaimer, the term of this patent is extended or adjusted under 35 U.S.C. 154(b) by 478 days.

(21) Appl. No.: 16/387,374

(22) Filed: Apr. 17, 2019

(65) Prior Publication Data

US 2020/0097676 A1 Mar. 26, 2020

Related U.S. Application Data

(60) Provisional application No. 62/766,609, filed on Sep. 25, 2018.

(51) Int. Cl.
| | |
|---|---|
| *G06F 21/62* | (2013.01) |
| *G06F 21/31* | (2013.01) |
| *G06F 21/64* | (2013.01) |
| *G06F 21/60* | (2013.01) |
| *G06F 21/55* | (2013.01) |

(52) U.S. Cl.
CPC ........ *G06F 21/6227* (2013.01); *G06F 21/316* (2013.01); *G06F 21/554* (2013.01); *G06F 21/604* (2013.01); *G06F 21/64* (2013.01)

(58) Field of Classification Search
CPC .... G06F 21/6227; G06F 21/316; G06F 21/64; G06F 21/604; G06F 21/554
See application file for complete search history.

(56) References Cited

U.S. PATENT DOCUMENTS

| | | | |
|---|---|---|---|
| 8,856,869 B1 * | 10/2014 | Brinskelle | G06F 21/6218 726/2 |
| 2006/0059154 A1 * | 3/2006 | Raab | H04L 63/0245 |

(Continued)

OTHER PUBLICATIONS

"Imperva SecureSphere 9.0 Security Target," Version 0.8, Sep. 19, 2012, 86 pages.

(Continued)

*Primary Examiner* — Harunur Rashid
(74) *Attorney, Agent, or Firm* — Nicholson, De Vos, Webster & Elliott, LLP

(57) ABSTRACT

A method for protecting information from databases includes a web application firewall and a database activity monitor. According to one aspect, a web gateway receives a request from a client device and provides the request to an application server to query a database. The web gateway receives sensitive data information describing requested data output by the database. The sensitive data information may include, for example, hints for detecting a type or structure of sensitive data output by the database. Additionally, the web gateway receives response data from the application server. The web gateway identifies sensitive data within the response data based on the sensitive data information. The web gateway protects the sensitive data to be provided to the client device using one or more data protection operations, which may include alerts, blocking policies, masking, or anomaly detection using machine learning algorithms.

30 Claims, 7 Drawing Sheets

(56) References Cited

U.S. PATENT DOCUMENTS

| | | | | |
|---|---|---|---|---|
| 2007/0294539 | A1* | 12/2007 | Shulman | G06F 16/24526 |
| | | | | 713/186 |
| 2011/0302634 | A1* | 12/2011 | Karaoguz | H04L 67/10 |
| | | | | 726/4 |
| 2011/0321150 | A1* | 12/2011 | Gluck | H04L 63/0254 |
| | | | | 726/11 |
| 2020/0106749 | A1* | 4/2020 | Jain | H04L 63/0435 |

OTHER PUBLICATIONS

Drews, "Imperva: The Leader in Application Data Security and Compliance," downloaded from https://www.slideserve.com/jorn/the-leader-in-application-data-security-and-compliance, uploaded Aug. 25, 2014, 15 pages.

Margel, et al., "Data Centric WAF," Imperva, Jun. 2017, 23 pages.

Wikipedia, "Cyclic redundancy check," last edited Feb. 19, 2019, downloaded from https://web.archive.org/web/20190416040444/https://en.wikipedia.org/wiki/Cyclic_redundancy_check on Aug. 20, 2021, 11 pages.

\* cited by examiner

DATA BASED WEB APPLICATION FIREWALL

CROSS-REFERENCE TO RELATED APPLICATIONS

This application claims the benefit of U.S. Provisional Application No. 62/766,609, filed Sep. 25, 2018, which is hereby incorporated by reference.

TECHNICAL FIELD

This disclosure relates to security in a computing system, and in particular to network security using a web application firewall (WAF) and a database activity monitor (DAM).

BACKGROUND ART

Databases may be implemented according to a variety of different database models, such as relational, non-relational, graph, columnar (also known as extensible record; e.g., HBase), object, tabular, tuple store, and multi-model. Examples of non-relational database models (which are also referred to as schema-less and NoSQL) include key-value store and document store (also known as document-oriented as they store document-oriented information, which is also known as semi-structured data). A database may comprise one or more database structures that are managed by a Database Management System (DBMS), each database structure may include a number of records, and each record may comprise of a set of cells. A record may take different forms based on the database model being used and/or the specific database structure to which it belongs; for example, a record may be: 1) a row in a table of a relational database; 2) a JavaScript Object Notation (JSON) document; 3) an Extensible Markup Language (XML) document; 4) a key-value pair; etc. In the context of a relational database, each relational database table (which is a type of database structure) generally contains one or more data categories logically arranged as columns according to a schema, where the columns of the relational database table are different ones of the cells from the plurality of records, and where each row of the relational database table is a different one of the records and stores "a data object" in each cell (for each category defined by the columns).

Web applications are targets of cyberattacks because they may represent accessible entry points into databases. A web application firewall or other application level security system may be used to detect, and possibly block, cyberattacks (e.g., an SQL injection attack) in an attempt to protect sensitive data of databases through web applications. However, it is difficult for conventional systems to detect unauthorized access to sensitive data, or data exfiltration, due for instance to an unstructured or unknown nature of the sensitive data once the sensitive data has left a database. Moreover, the formatting of sensitive data can be inconsistent between different web applications or databases, which makes it challenging to identify sensitive data from other data. Existing web application firewalls may monitor traffic to and from web applications. However, these approaches may not have sufficient information about the nature of the data to detect sensitive data associated with the database. Thus, they are usually inaccurate and limited in the nature of data they can search for (e.g., can be used for detecting types of data that have an easily searchable pattern and are known to be sensitive based just on their type, such as credit cards and social security numbers; but not other types of data, such as those that lack an easily searchable pattern and/or are not know to be sensitive based on just their type, such as names, phone numbers, email addresses, IP addresses). In addition, it is inefficient for existing web application firewalls to scan all data passing through web applications to search for potentially sensitive data that is provided by the database and that is to be protected.

Additionally or alternatively, existing systems use database activity monitoring via a database gateway. Such systems are monitoring SQL queries sent by web applications to databases. Unfortunately, it is difficult for such systems to attribute exfiltrated data to a particular user of a client device and/or to tell which data is exfiltrated from the DB for caching/processing purposes and which actually leaves the perimeter and makes it all the way to a client device.

SUMMARY OF THE INVENTION

A web application firewall (WAF), in conjunction with a database activity monitor (DAM), protects sensitive data in a database that is being accessed through web applications in a network infrastructure. In one embodiment, the WAF is implemented as a web gateway that manages communication between a client device and an application server executing a web application. The DAM is implemented as a database gateway that analyzes data from a database that is retrieved by (also referred to as "provided to") the application server executing the web application. The database gateway may identify sensitive data from the database and provide sensitive data information describing the sensitive data to the web gateway. Sensitive data includes, for example, personally identifiable information, proprietary or confidential information, security data, etc. The sensitive data information may include hints for detecting the sensitive data such as information describing formatting or structure of the sensitive data. Using the sensitive data information, the web gateway can identify sensitive data within response data from the application server. The response data may be provided in response to a request for data by the client device. The web gateway performs one or more security operations (also referred to as "data protection operations") on the identified sensitive data, for example, logging user data accesses, generating an alert, enforcing data access policies, masking sensitive data, or using machine learning algorithms to detect anomalies. Furthermore, the web gateway may block or provide protected data in place of the sensitive data to the client device.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Example System Overview

Figure 1A:
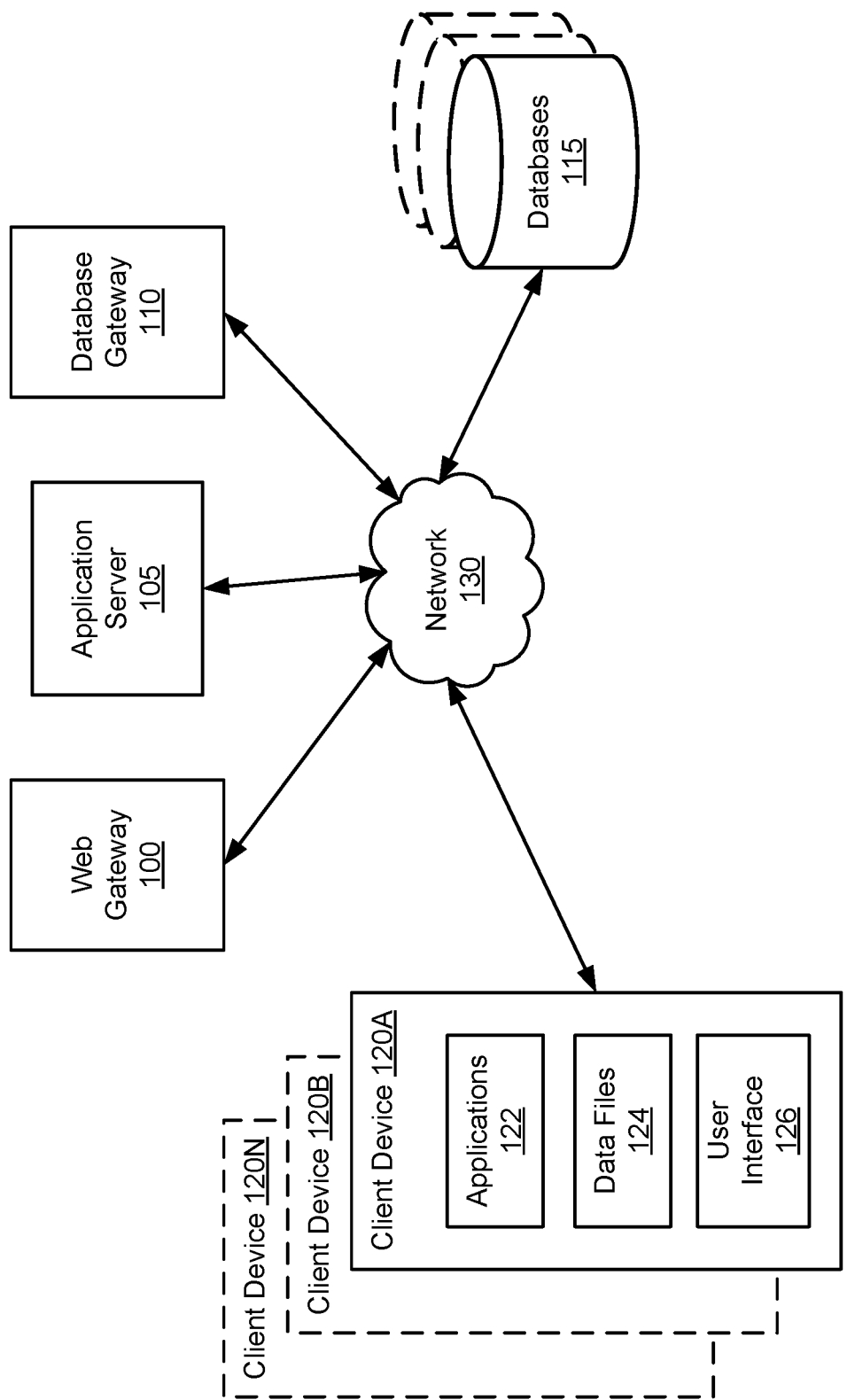
FIG. 1A is a diagram of a system environment for protecting sensitive data from databases, according to one embodiment.

FIG. 1A is a diagram of a system environment for protecting sensitive data from databases, according to one embodiment. The system environment includes a web gateway 100, application server 105, database gateway 110, one or more databases 115, and one or more client devices 120 (e.g., client devices 120A, 120B . . . 120N) connected over a network 130. In alternative configurations, different and/or additional components may be included in the system environment. For example, although one web gateway 100, application server 105, and database gateway 110 are shown in FIG. 1A, in other embodiments, the system environment may include any number of application servers 105 protected by different instances of web gateways 100 and database gateways 110.

Embodiments may be used in conjunction with databases implemented according one or more different database models (e.g., those previously described), the parts of which are generically referred to using the above described terms "database structures," each comprising "records" comprised of "cells" that each store a data object. However, by way of example, embodiments will be described with reference to relational databases, where each relational database includes database tables (as its database structures) logically arranged as columns and rows (as it records), the intersection of which are cells each storing a data object.

The client devices 120 are one or more computing devices capable of receiving user or non-user input as well as transmitting or receiving data via the network 130. A client device 120 may be an electronic device such as a smartphone, tablet computer, desktop computer, laptop computer, or another suitable type of device that can access content or services provided by an application server 105 or database 115. The client device 120 may include any number of applications 122 such as web browser(s) and other client applications. In addition, the client device 120 can transmit a request (e.g., an HTML request) for data to an application server 105 (more specifically, a web application being executed on the application server 105), which may be associated with a certain application 122. The client device 120 can execute applications 122 to create, delete, view, or edit data files 124. The client device 120 can present information via a user interface 126, for instance, the client device 120 may render web application data received from the application server 105 using a web browser.

The application server 105 includes server hardware. The application server 105 executes web application(s) to generate content, e.g., in Hypertext Markup Language (HTML) or another suitable language, responsive to requests sent by the client device 120. The web application(s) being executed by the application server 105 may send queries, e.g., a Structured Query Language (SQL) query, for data from a database 115. Additionally, the web application(s) being executed by the application server 105 can generate content using the data from the database 115 and/or provide the data to the client device 120. For example, the client device 120 executing a browser can transmit a request (also sometime referred to as a "request for data;" e.g., an HTML request) to a web application being executed on the application server 105; in response, the web application may submit one or more queries (e.g., SQL queries) to and receive data (also referred to as the "requested data" or "query results") back from the one or more databases 115; and this requested data may be included in or be used to generated a response (which contents is also referred to a "response data") sent back to the client device 120 by the web application. This response data may include non-sensitive data and/or sensitive data. The request for data and the response data is visible to the WAF implemented as the web gateway 100, and the one or more queries and the requested data is visible to the DAM implemented as the database gateway 110.

The database gateway 110 monitors data access to one or more databases 115. The database gateway 110 can parse requests (queries) and/or responses (query results) of a database 115 and identify sensitive data that leaves the database 115. For example, in the case of a relational database where a "cell" is the intersection of a column and a row of a database table and where the contents of a cell may be referred to as a "data object," the "data object" is referred to as a "sensitive data object" if it includes sensitive data. In an embodiment, the database gateway 110 identifies sensitive data using metadata of the database 115 or information associated with a query. For instance, the database gateway 110 may use metadata including attributes of a database table (in which requested data resides) such as a name of a column or the database table (sometimes referred to as a data table) found in a query. Additionally or alternatively, a regular expression may be used to parse information from a database table (i.e., parsing the query result). Example information associated with the query may include a format of the requested data or a user-specified sensitive data parameter, for instance a name of a user for looking up a credit card number or social security number of the user, or a timestamp. Put another way, the database gateway 110 determine whether a query result will or has information deemed to be sensitive because of the type of information it is (e.g., personal mail address, employee name, social security number, credit card number, home phone number, personal email, IP address, passport number, biometric, demographic information, login username and password, other personally identifiable information, etc.) and/or because it has been labeled (e.g., via an offline manual/ automated classification of data in tables and columns) as such (e.g., a sensitivity level has been identified, such a SENSITIVE, INSENSITIVE, PARTIALLY_SENSITIVE). The phrase "metadata of the requested data" refers to metadata associated in some way with the requested data, such as: 1) metadata that is stored in the database, that describes database structures from which the requested data was accessed, and that is found in the query (e.g., database table name, column name, etc.); 2) metadata that is stored in the database, that describes database structures from which the requested data was accessed, and that is not found in the query (e.g., a column descriptor, etc.); 3) metadata that may or may not be stored in the database, but is associated in some way with the requested data (e.g., metadata describing the requested data that was input from an offline manual/ automated classification of data in tables and columns) and/or with the query. The database gateway 110 may use one or more techniques to identify sensitive data leaving the database 115, including the use of: 1) database metadata found in the query (e.g., if the column name and/or table name reflect the query results will be sensitive, such as a column named "social security number" or "employee name"); 2) database metadata found in the query in conjunction with information that may be associated with the query (e.g., information indicating that a particular column or table contains sensitive data—different embodiments may have access to such information one or more different ways, including the accessing/analyzing of column descriptions within the database and/or the receipt of input from an offline manual/automated classification of data in tables and columns); 3) pattern matching on the query result; and/or 4) pattern matching in conjunction with database metadata found in the query and/or information that may be associated with the query. The sensitive data leaving a database 115 may take different forms, such as: a) the data may not have an easily searchable pattern (e.g., an employee name), and techniques 1 or 2 may be used; b) the data may have an easily searchable pattern and be known to be sensitive based just on its type (e.g., a social security number, a credit card number), and technique 3 or techniques 1, 2, or 4 may be used depending on the column/table names used and/or the availability of information that may be associated with the query; or c) the data may have an easily searchable pattern but not be known to be sensitive based just on its type (e.g., a home phone number vs. a business phone number; a personal email vs. a business email; an IP address), and technique 1, 2, or 4 may be used depending on the column/table names used and/or the availability of information that may be associated with the query.

The DAM implemented as the database gateway 110 generates sensitive data information describing identified sensitive data. Moreover, the database gateway 110 may provide the sensitive data information to a web gateway 100 as hints for detecting the corresponding sensitive data. Accordingly, the database gateway 110 can provide contextual information (e.g., information regarding the structure of the sensitive data and/or the content of the sensitive data) to the web gateway 100 regarding sensitive data that has left the database 115 and/or when to expect (when to search for) the sensitive data from an application server 105 (e.g., the time of the request/query (e.g., when it was received by the database gateway 110 and/or the database 115) and/or the time of the requested data/query result (e.g., when it left the database 115 and/or was received by the database gateway 110), so that the web gateway 100 may use these time(s) to limit its search to HTTP responses for which: 1) the HTTP request was received by the web gateway 110 before the request/query time; and/or 2) the HTTP response was received after the requested data/query result time). The sensitive data information may describe data that left the database 115 within a predetermined period of time, e.g., the last hour, several hours, or day, and the database gateway 110 may generate updated sensitive data information as additional information is output by the database 115. In some embodiments, the sensitive data information includes one or more of: a subset of a plaintext representation (e.g., a suffix or prefix) of a portion (a given sensitive data object) of requested data from the database 115 (in other words, a subset of a sensitive data object included in the requested data), a length of the portion of the requested data (in other words, a length of the given sensitive data object), a checksum of the portion of the requested data (in other words, a checksum of the given sensitive data object), a hash of the portion of the requested data (in other words, a hash of the given sensitive data object), the sensitive data object itself, or other information indicative of formatting of sensitive data. For example, where the requested data/query result includes sensitive data objects from multiple cells, then in some embodiments there is, for each such sensitive data object, sensitive data information. By way of specific example, in such embodiments the sensitive data information may include, for each cell containing sensitive data, one or more of the following: a length of the sensitive data object (as structure information), a subset (a predetermined amount of data—e.g., X bytes) at a predetermined location (e.g., a suffix or prefix) of a plaintext representation of the sensitive data object (as content information), a checksum of the sensitive data object (as content information), and/or a hash of the sensitive data object (as content information). Thus, some embodiments include one or more of the following in the sensitive data information: 1) the hash or checksum to improve security by avoiding sending the sensitive data itself to the web gateway 100; 2) the subset to make the searching performed by the web gateway 100 of a given response more efficient/improve performance as compared to searching through all of the requested data for the hash or the sensitive data itself; 3) the sensitive data object length to use in calculating hashes or checksums; and 4) the when to expect (when to search for) the sensitive data to reduce the number of responses from the application server 105 the web gateway 100 searches using a given piece of sensitive data information. Of course, alternative embodiments may include more, less, and/or different information in the sensitive data information (e.g., items 2-4 and the sensitive data itself (rather than item 1); only item 4 and the sensitive data itself; items 1-3, but not 4, and the web gateway 100 must decide which queries and query results to search on its own (such as all received within a fixed time window surrounding the receipt of the sensitive data information); the sensitive data itself (rather than item 1) and item 2, but not 4, and the web gateway 100 must decide which queries and query results to search on its own (such as all received within a fixed time window surrounding the receipt of the sensitive data information)). The database gateway 110 may also save sensitive data information on local storage or on another system.

In some embodiments, the database gateway 110 performs security operations (also referred to as "data protection operations") (e.g., generating an alert, blocking, masking, sending sensitive data information to the web gateway, etc.) responsive to monitoring traffic being communicated with a database 115. In particular, the database gateway 110 may detect data objects queried (query analysis) or output (query result analysis) from the database 115 to other components of the system such as application servers 105. Furthermore, the database gateway 110 may track actions such as a number or type of requests transmitted to the database 115 as well as determine trends associated with tracked actions. In addition to sending sensitive data information, the database gateway 110 may also send other information to a web gateway 100 such as tracked actions, alerts, or information describing new or updated security policies, among other types of information for protection of a database 115.

The WAF implemented as the web gateway 100 to protect sensitive data from application servers 105 and/or databases 115. The web gateway 100 serves as an interface between the client devices 120 and application servers 105. Thus, the WAF is aware of users, client devices, web applications, application servers, and requests/responses between them; and thus, can generate a map representing one or more aspects of this. In an embodiment, responsive to receiving requests from a client device 120 for data from a database 115, the web gateway 100 routes the requests to the appropriate application server 105 and receives response data in response to the requests. The web gateway 100 may determine whether to provide response data to client devices 120, or perform some form of security operations (also referred to as "data protection operations") (e.g., block or protect response data from being received by client devices 120, flag the identified sensitive data for review by personnel associated with the web gateway). For example, in response to determining that a request originated from a potentially malicious client device 120, the web gateway 100, using the sensitive data information provided by the database gateway 110, can detect transmission of sensitive data from a database 115 through a web application to the client device 120; and: 1) combine this with information from or add it as supplemental information to the above identified map, thereby allowing the web gateway to know which user accessed which data items, when, from where and how many (this is sometimes referred to as a data audit); and/or 2) prevent or limit the transmission of the sensitive data. A malicious client device 120 may attempt to attack or expose a vulnerability of the network infrastructure using a SQL injection or another type of attack or request. The web gateway 100 in conjunction with the database gateway 110 can block or mitigate events associated with an undesirable effect on the system caused by client devices 120.

As described above, the web gateway 100 can use the sensitive data information received from the database gateway 110 to identify sensitive data in responses from web applications. The web gateway 100 may store sensitive data information in memory or cache and retrieve the sensitive data information for later use, for example, when a subsequent request is received from a client device 120. Additionally, the web gateway 100 may track activity of users of client devices such as previous requests for data from a database 115 and/or application server 105.

In an embodiment, the web gateway 100 receives from the database gateway 110 the above described sensitive data information including the subset, length, checksum, and hash of a portion of the requested data considered to be sensitive data. The web gateway 100 determines if the subset of the plaintext representation matches a subset of a portion of the response data received from the application server 105 (signifying that some part of the response data includes the subset in the sensitive data information, and thus may include the sensitive data object that the sensitive data information describes), for example, by comparing prefixes. In response to the subset of the plaintext representation matching the portion of the response data, the web gateway 100 calculates a checksum of the plaintext representation (e.g., based on a complete string in a HTTP response) according to the length from the database gateway 110. The web gateway 100 determines if the calculated checksum matches the checksum received from the database gateway 110. In response to the calculated checksum matching the checksum received from the database gateway 110, the web gateway 100 generates a hash according to the length. The web gateway 100 determines if the generated hash matches the hash received from the database gateway 110. In response to the generated hash matching the hash received from the database gateway 110, the web gateway 100 identifies the portion of the response data as the sensitive data within the response data.

In other embodiments, the web gateway 100 may perform the above determination steps in a different order, or identify the sensitive data using a subset of the above determination steps or any other combination of steps to determine whether information matches between the response data and the requested data. For example, in embodiments where the web gateway 100 receives from the database gateway 110 sensitive data information that includes a subset, a length, and a hash (or a checksum), the web gateway 100 identifies sensitive data within the response data by: 1) identifying a set of zero or more locations within the response data that match the subset provided in the sensitive data information; 2) generating, for each of the locations in the set of locations, a hash (or a checksum) of a part of the response data based on the length (e.g., for each identified location in the response data, a hash (or checksum) of a part of the requested data, where the part is at a position in the response data that is based on the identified location and where the part is of the length in the sensitive data information); 3) comparing the resulting set of or zero or more hashes (or checksums) to the hash (or checksum) in the sensitive data information; and 4) identifying the zero or more parts of the response data that match as sensitive data (as a sensitive data object). Furthermore, the web gateway 100 may use other types of search algorithms to identify the sensitive data, or improve efficiency or search speed in identifying the sensitive data. The web gateway 100 may determine the above mentioned "matches" based on a threshold difference instead of an exact match. For example, the subset of the plaintext representation matches the subset of the portion of the response data responsive to determining that the subset of the plaintext representation has at least a threshold number of (e.g., alphanumerical) characters in common with the subset of the portion of the response data.

Thus, the database gateway 110: 1) detects the accessing (e.g., by web applications responsive to request from client devices) of data objects (e.g., the contents of cells at the intersections of columns and rows of database tables) that are stored in database(s) and that are deemed to include sensitive information (through one or more ways, such as extraction of table and/or column names specified in the request (query) and/or or analysis of the data objects in the response (query result)); and 2) sends sensitive data information (e.g., hints) to enable to web gateway 100 to detect these data objects, which include sensitive data, in responses (e.g., HTTP responses) being sent by web applications to client devices.

The web gateway 100 may perform one or more types of security/data protection operations to protect identified sensitive data. In an embodiment, the web gateway 100 logs accesses to data from databases 115 and information describing users or client devices 120 that accessed the data, e.g., indicating an Internet Protocol (IP) address, or anonymous source such as a Tor network, of a requesting client device 120, whether the client device 120 is associated with a human user or a bot that provides automated requests, a geographical location of client device 120, or hypertext transport protocol (HTTP) session information, among other types of information. Based on data access logs, the web gateway 100 may generate an alert or enforce a policy responsive to determining that a criteria associated with the alert or policy, respectively, has been satisfied. It should be noted that the security/data protection operations performed by the web gateway 100 may be configured by an entity associated with the web gateway (such as a security engineer or network administrator). In such embodiments, the entity associated with the web gateway 100 can specify an operation to perform for one or more types of identified sensitive data. For example, the web gateway 100 can be configured to provide data to a requesting client device and send an alert to a security engineer whenever a phone number is detected within the data, and to encode data before providing to a requesting client device when a social security number is detected within the data.

A criteria associated with an alert or policy may indicate a threshold access rate, e.g., a threshold number of accesses to a database 115 (or for a certain type of data) within a predetermined time frame. The criteria may also specify a type of user associated with the threshold access rate such as an administrator or automated bot of a client device 120. The web gateway 100 may enforce a policy by blocking a client device 120 from providing additional requests for data access or receiving further data from a database 115, e.g., until the criteria has been reset. In some embodiments, criteria for enforcing a blocking policy is associated a greater threshold access rate than that of another criteria for triggering an alert. As an example, criteria may be used to restrict access of a particular type of user (e.g., an automated bot or unknown device type) to a certain type of data (e.g., social security numbers). The web gateway 100 can also use criteria to limit data access requests from potentially suspicious IP addresses. In some use cases, the web gateway 100 performs security/data protection operations based on a risk level of a login associated with a user session of a client device 120. The risk level may correspond to a predicted likelihood that a request or client device 120 is malicious.

In some embodiments, the web gateway 100 performs security/data protection operations in an "inline mode." During inline mode, the web gateway 100 can mask data in real time. For example, the web gateway 100 modifies a HTTP response to remove or redact at least a portion of sensitive data identified in the response. The web gateway 100 may other perform other operations such as data encryption using a cryptographic key, anonymizing or obfuscating sensitive data, or applying a cryptographic hash function. In other embodiments, the web gateway 100 performs security/data protection operations in a "sniffing mode." During sniffing mode, the web gateway 100 can perform an audit on data access logs or other aggregated information describing requests and response data provided to client devices 120. In sniffing mode, the web gateway 100 does not perform security/data protection operations in real-time such as blocking sensitive data before responses are sent to client devices 120.

Regardless of inline or sniffing mode, in some embodiments the web gateway 100 may generate a data audit that may include a mapping of a user (of a client device 120) to specific data items accessed by the user, when the access occurred, from which database 115 data was accessed, or how many data items were accessed, among other access-related information. The web gateway 100 may run a behavioral analysis (e.g., offline) of data access information to trigger alerts or enforcement of policies. In some use cases, the web gateway 100 uses machine learning algorithms or a trained machine learning model to detect anomalies in data access information. For instance, the web gateway 100 determines if a specific user or client device 120 is providing a number of requests greater than an expected threshold, or requesting data during unexpected periods of time.

The network 130 may comprise any combination of local area and/or wide area networks, using both wired and/or wireless communication systems. In one embodiment, the network 130 uses standard communications technologies and/or protocols, e.g., Ethernet, 802.11, worldwide interoperability for microwave access (WiMAX), 3G, 4G, code division multiple access (CDMA), digital subscriber line (DSL), etc. Examples of networking protocols used for communicating via the network 130 include multiprotocol label switching (MPLS), transmission control protocol/Internet protocol (TCP/IP), HTTP, simple mail transfer protocol (SMTP), and file transfer protocol (FTP). Data exchanged over the network 130 may be represented using any suitable format, such as (HTML) or extensible markup language (XML). In some embodiments, all or some of the communication links of the network 130 may be encrypted using any suitable technique or techniques.

The components shown in FIG. 1A may include a processor for manipulating and processing data, and a storage medium for storing data. The storage medium may include both volatile memory (e.g., random access memory) and non-volatile storage memory such as hard disks, flash memory, and external memory storage devices. In various embodiments, the storage medium comprises a non-transitory computer-readable storage medium. Various executable programs are each embodied as computer-executable instructions stored to the non-transitory computer-readable storage medium. The instructions when executed by the processor cause the corresponding component (e.g., web gateway 100 or database gateway 110) to perform the functions attributed to the programs described herein. In various embodiments, the web gateway 100, database gateway 110, and application server 105 may comprise distinct, different computing devices. The web gateway 100 and the database gateway 110 may be associated with a same entity, e.g., a provider of a security system or web application firewall. The application server 105 or databases 115 may be associated with a third party. Furthermore, the web gateway 100, database gateway 110, application server 105, client devices 120, or databases 115 may be located in different geographical locations, e.g., at a client site or data center.

Figure 1B:
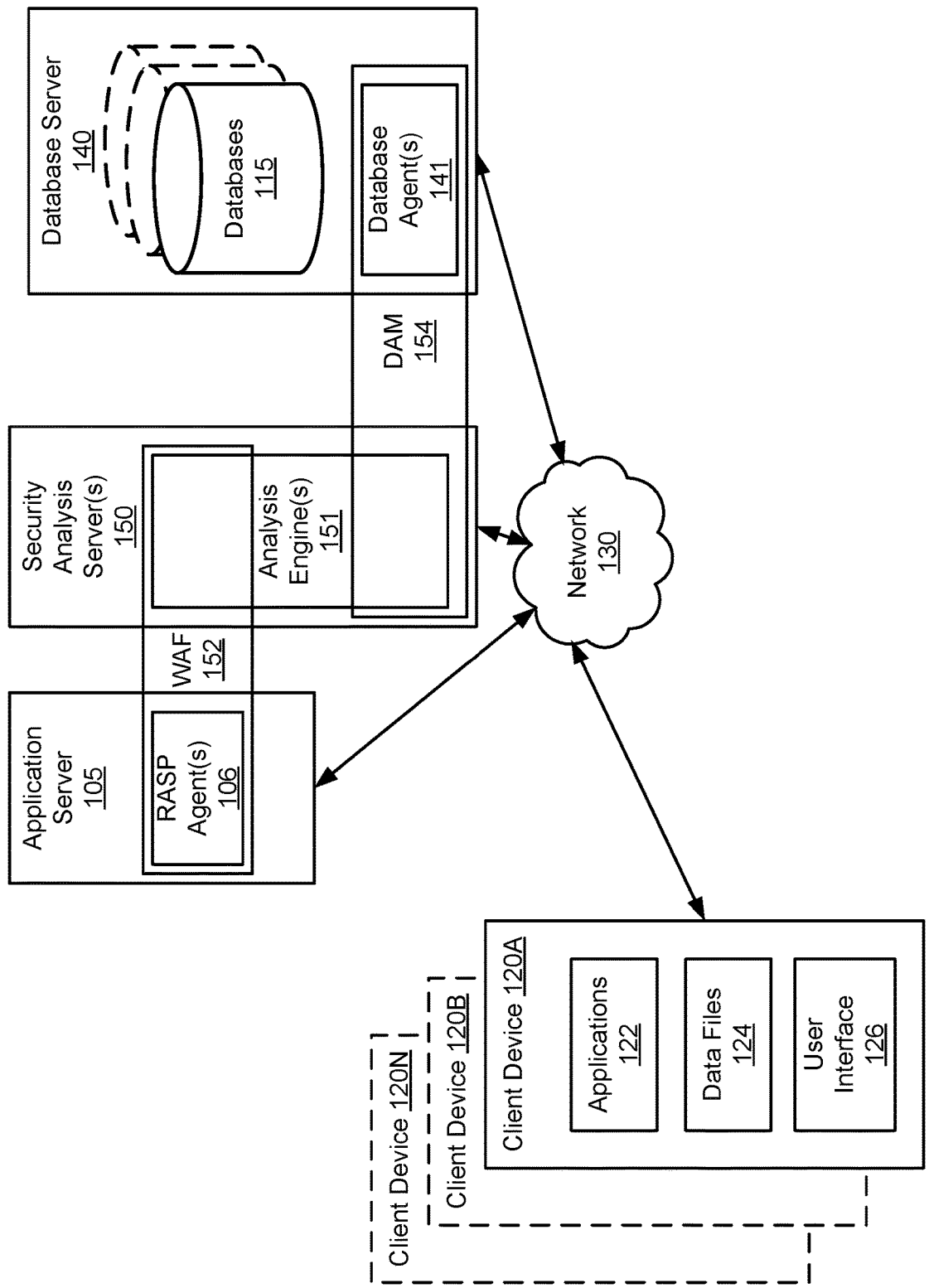
FIG. 1B is a diagram of another system environment for protecting sensitive data from databases, according to one embodiment.

FIG. 1B is a diagram of another system environment for protecting sensitive data from databases, according to one embodiment. FIG. 1B includes the client device 120, network 130, application server 105, and databases 140 from FIG. 1A. In addition, FIG. 1B shows: 1) Runtime Application Self-Protection (RASP) agent(s) 106 that are part of the runtime executing the web application(s) on the application server 105 and that are communicating with one or more of analysis engine(s) 151 executing on analysis server(s) 150 to implement a WAF 152; and 2) the database(s) 141 are hosted on a database server 140 that is also executing database agent(s) 141 that are communicating with one or more of analysis engine(s) 151 executing on analysis server(s) 150 to implement the DAM 154. While FIG. 1A shows a WAF and DAM implemented by a web gateway 100 and a database gateway, FIG. 1B shows a WAF and DAM implemented with RASP agent(s) 106, database agent(s) 141, and analysis engine(s) 151.

While in some embodiments the application server 105, database server 140, and security analysis server(s) 150 in FIG. 1B represent separate server hardware, in other embodiments one or more of these may share server hardware. In some embodiments, there are separate analysis engines implemented by separate analysis servers to provide the WAF 152 and the DAM 154, and the analysis engine implementing the DAM 154 sends the sensitive data information to the analysis engine implementing the WAF 152 on the separate analysis server. However, other embodiments do not have this level of separation (e.g., there are separate analysis engines to provide the WAF 152 and the DAM 154, but they are being implemented by a single security server 150 (the same server hardware); there is a single analysis engine implemented by a single security server 150 to provide both the WAF 152 and the DAM 154).

Thus, a WAF may be implemented as a single unit, or may comprise multiple units such as an analysis server coupled in communication with one of more agents that are each part of a runtime environment (e.g., as a RASP) executing a web application. Such a single unit and/or such an analysis server may be implemented in a standalone electronic device (typically on premises), in a virtual appliance (on premises or in the cloud) executed by server hardware, and/or as a SaaS in the cloud (which service is provided by software being executed by server hardware in the cloud); while such agents may be part of a runtime environment (e.g., as a RASP) executing on server hardware to execute a web application server. Also, a WAF may be inline or a sniffer (out of band).

Similarly, a DAM may be implemented as a single unit, or may comprise multiple units such as an analysis server coupled in communication with one of more database agents that are each executing on a database server. Such a single unit and/or such an analysis server may be implemented in a standalone electronic device (typically on premises), in a virtual appliance (on premises or in the cloud) executed by server hardware, and/or as a SaaS in the cloud (which service is provided by software being executed by server hardware in the cloud); while such database agents may be executing with a database server on server hardware. Also, a DAM may be inline or a sniffer (out of band).

As a result of the sensitive data information being provided by the DAM (e.g., database gateway 110 or DAM 154) to the WAF (e.g., web gateway 100 or WAF 152), this system can detect in the WAF (e.g., web gateway 100 or WAF 152) unauthorized access to sensitive data from the database(s) 115 and attribute the access to a particular user (because the WAF is aware of users, while it is more difficult for the DAM to associate a database access to a particular user); further the system distinguishes between data accessed for caching/processing purposes (which data would be identified by the DAM when it is queried/sent from the database 115 to the application server 105, but that data would not be sent by the application server 105 through the WAF to the client 120) as opposed to data that will be sent to the client (which data would be identified by the DAM when it is queried/sent from the database 115 to the application server 105, and that data would be sent by the application server 105 and have to pass through the WAF on its way the client device 120; in other words, the WAF is analyzing requests and responses (also referred to as response data) being sent to the client device 120, as opposed to the DAM which is analyzing queries and query results (also referred to as requested data) which may or not make it into any responses (response data) being sent to the client device 120). Further, as a result of the sensitive data information being provided by the DAM to the WAF, this detection may be performed: 1) without the WAF scanning all data being sent by the web applications to the client devices; and 2) in the WAF even if the data is unstructured, even though the data has left the database, and even if the data has inconsistent formatting between different web applications or databases. This is because the DAM has sufficient information about the database 115 and the data in that database to determine which data is sensitive and to generate the sensitive data information in a manner that can be used by the WAF to detect that sensitive data in responses regardless of it being unstructured or in different formatting.

Example Data Flow

Figure 2A:
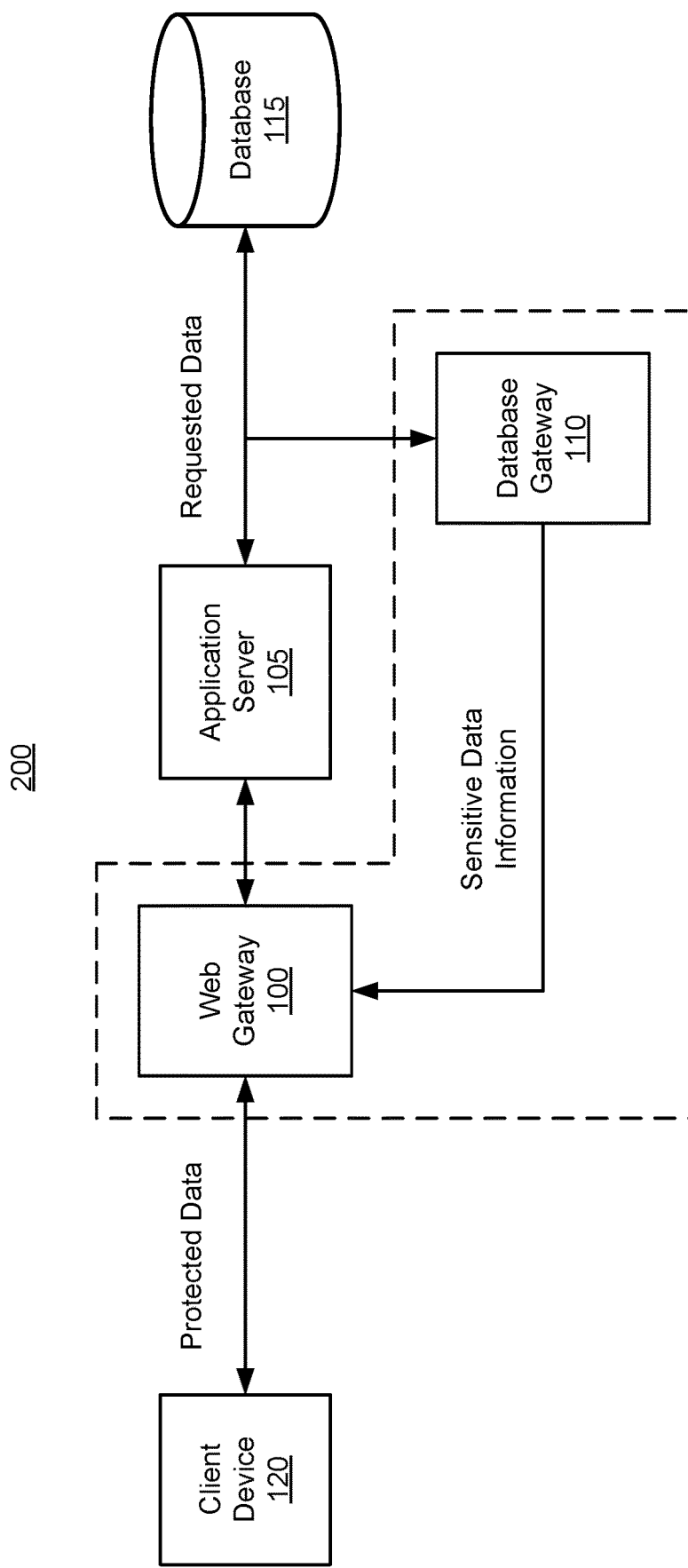
FIG. 2A is a diagram of data flow between a database gateway and a web gateway, according to one embodiment.

FIG. 2A is a diagram 200 of data flow between a database gateway and a web gateway, according to one embodiment. As previously described, the client device 120 may send a request for data. The web gateway 100 may forward the request from the client device 120 to the application server 105 to query the database 115. The database gateway 110 may monitor the query and data output from the database 115 including the requested data of the client device 120. The application server 105 may determine response data based on the requested data retrieved from the database 115. Responsive to the request from the client device 120, the application server 105 may provide the response data to the web gateway 100 to send to the client device 120.

Additionally, the database gateway 110 is communicatively coupled to the web gateway 100. The database gateway 110 provides sensitive data information describing sensitive data output from the database 115 to the web gateway 100. In the embodiment shown in FIG. 2A, the web gateway 100 does not necessarily transmit information back to the database gateway 100, though in other embodiments, there may be two-way communication between the database gateway 110 and the web gateway 100. The web gateway 100 can use the sensitive data information received from the database gateway 110 to identify sensitive data within response data from the application server 105. The web gateway 100 generates protected data using the identified sensitive data and provides the protected data to the client device 120 responsive to the request. An example use case of the data flow of FIG. 2A to protect sensitive data is described below with reference to FIG. 2B.

Figure 2B:
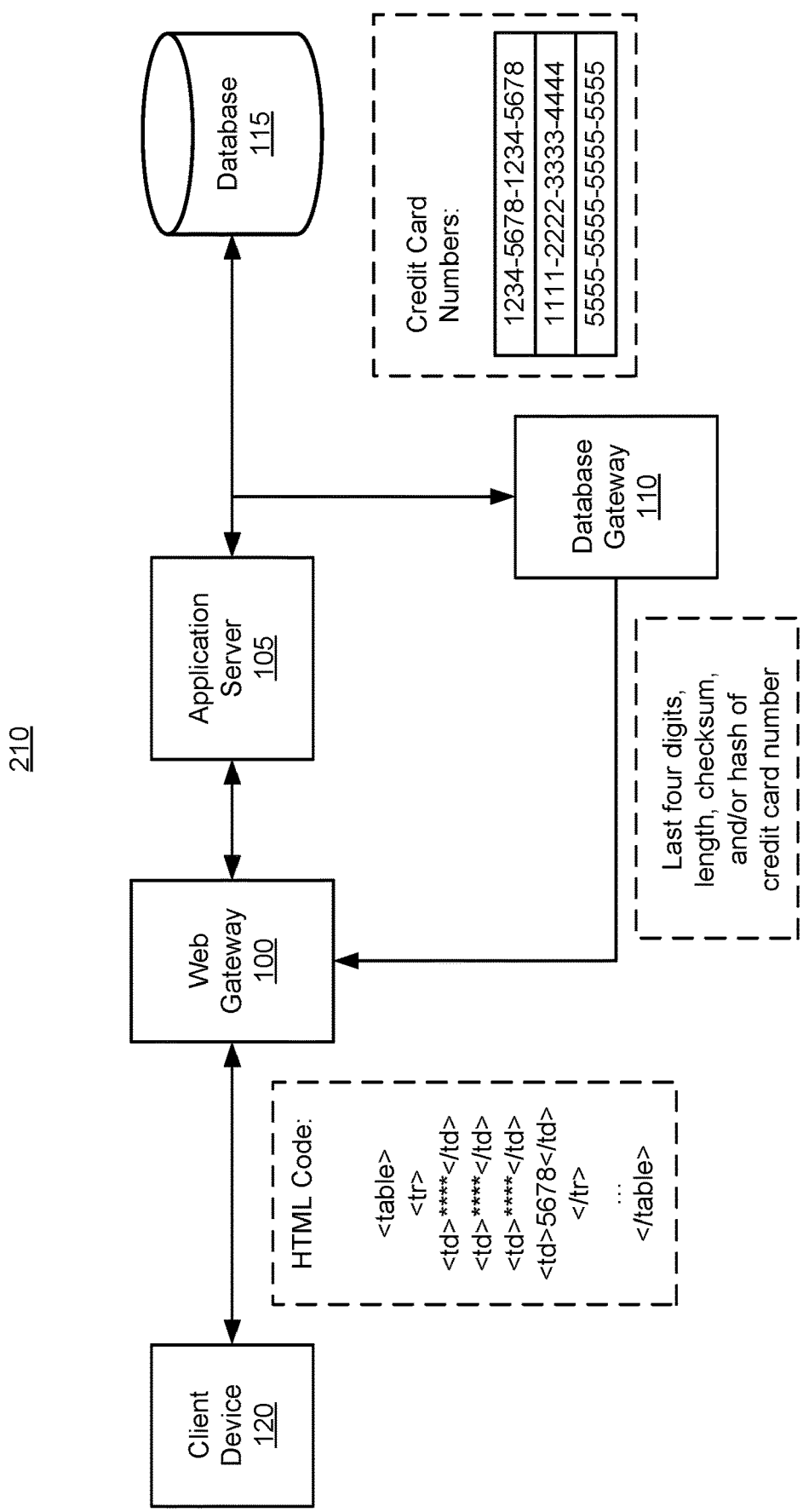
FIG. 2B is another diagram of data flow between a database gateway and a web gateway, according to one embodiment.

FIG. 2B is another diagram of data flow between a database gateway and a web gateway, according to one embodiment. In the example illustrated in FIG. 2B, the client device 120 sends a request to the application server 105 that causes a query for credit card number information from the database 115. The database gateway 110 monitors the query and requested data from the database 115 provided to the application server 105. By processing the query and/or requested data as described above, the database gateway 110 determines sensitive data information including one or more of: the last four digits (e.g., or another subset of digits) of a credit card number, a length of a credit card number (e.g., in string format), a checksum of a credit card number, or a hash of a credit card number. In other embodiments, the sensitive data information may be based on, or include, all digits of the credit card number. In some embodiments, the database gateway 110 can use any suitable checksum algorithm or hash function algorithm to map digits of the credit card number to a checksum value or hash value, respectively. Thus, the database gateway 110 may prevent or limit unwanted exposure of sensitive data by transmitting the checksum value or hash value, e.g., instead of sending unprotected or unencrypted plaintext information or other raw data retrieved from the database 115. The database gateway 110 provides the sensitive data information describing the credit card information to the web gateway 100.

The web gateway 100 receives response data including the credit card numbers from the application server 105. Using the sensitive data information received from the database gateway 110, the web gateway 100 identifies credit card numbers in the response data as sensitive data. The web gateway 100 may protect the identified credit card numbers by modifying a response to be provided to the client device 120. The example HTML code shown in FIG. 2B corresponds to a table for presenting credit card numbers. Responsive to identifying a particular credit card number in the HTML code, the web gateway 100 can modify the HTML code to redact a portion of the particular credit card number. For instance, the web gateway 100 replaces each of the digits of the credit card number with another character (e.g., asterisk), except for the last four digits. Although the example of FIG. 2B includes credit card numbers, the embodiments described herein may be used to protect other types of sensitive data such as social security numbers, contact information (e.g., employee name, phone numbers, emails addresses, IP addresses), passport numbers, biometrics, demographic information, login username and passwords, among others. Also, although there are solutions described in the background section that can detect credit cards and social security numbers (but not some other data types), embodiments of the invention, which use a data based WAF that operates with sensitive data information for a DAM, may: 1) detect other types of data (including those that lack an easily searchable pattern and/or are not known to be sensitive based on just their type, such as names, phone numbers, email addresses, IP addresses); and/or 2) detect types of data that have an easily searchable pattern and are known to be sensitive based on just their type (e.g., credit cards/social security number) using the sensitive data information rather than the solutions described in the background section.

While FIG. 2A-2B are described with reference to FIG. 1A, the concepts of FIG. 2A-B are equally applicable to the system of FIG. 1B. For example, the DAM agent(s) 141 communicating with the analysis engine(s) 151 responsive to detecting the credit card information being retrieved from the database, and the analysis engine(s) 151 instructing the RASP agent(s) 106 to use sensitive data information to detect the existence of the sensitive data in responses from the web application.

Figure 3A:
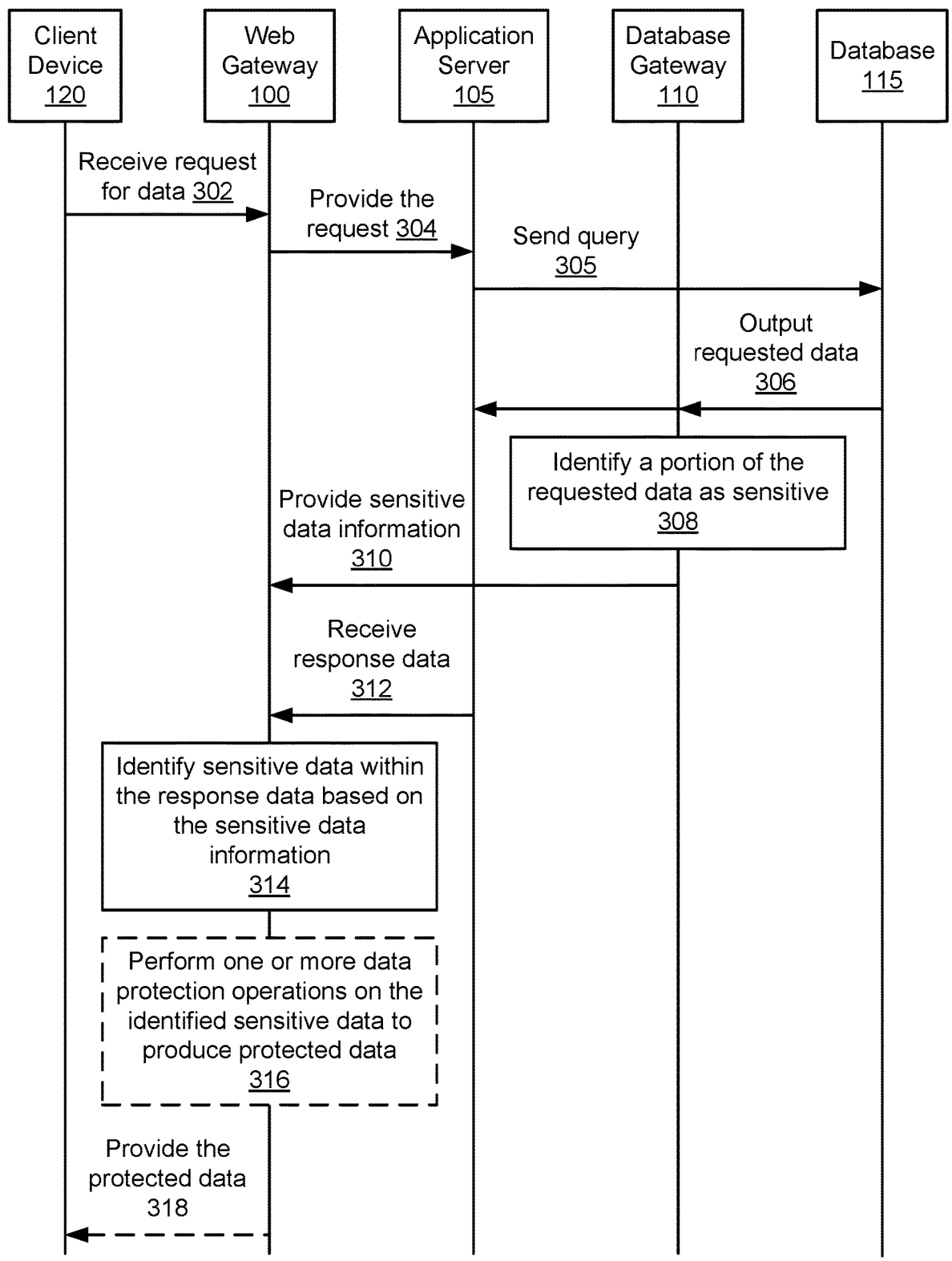
FIG. 3A illustrates a sequence diagram for protecting sensitive data, according to one embodiment.

FIG. 3A illustrates a sequence diagram for protecting sensitive data, according to one embodiment. In the example shown in FIG. 3A, the web gateway 100 receives 302 a request for data from the client device 120. Responsive to receiving the request, the web gateway 100 provides 304 the request to the application server 105. Responsive to receiving the request from the web gateway 100, the application server 105 sends 305 a query to the database 115 for the requested data. Responsive to the query, the database 115 outputs 306 the requested data, which is received by the application server 105 and monitored by the database gateway 110. In some embodiments, the requested data is structured data, for instance, based on a database table of the database 115. The database gateway 110 identifies 308 a portion of the requested data as sensitive as described above (e.g., based on metadata from the database 115 such as a table row or column name related to credit card information, based on the result of performing pattern matching on the requested data, and/or information that may associated with the query). The requested data may include a combination of sensitive data and non-sensitive data. The database gateway 110 provides 310 sensitive data information describing the identified sensitive data to the web gateway 100, which is also previously shown in FIGS. 2A-B.

The web gateway 100 receives the sensitive data information from the database gateway 110 and also receives 312 response data from the application server 105. The web gateway 100 identifies 314 sensitive data within the response data based on the received sensitive data information. In some embodiments, the response data is unstructured markup language data that is parsed by the web gateway 100. As previously described, the web gateway 100 may perform 316 one or more security/data protection operations (e.g., modify the identified sensitive data to produce protected data). As also previously described, the web gateway 100 may provide 318 the protected data to the client device 120.

Figure 3B:
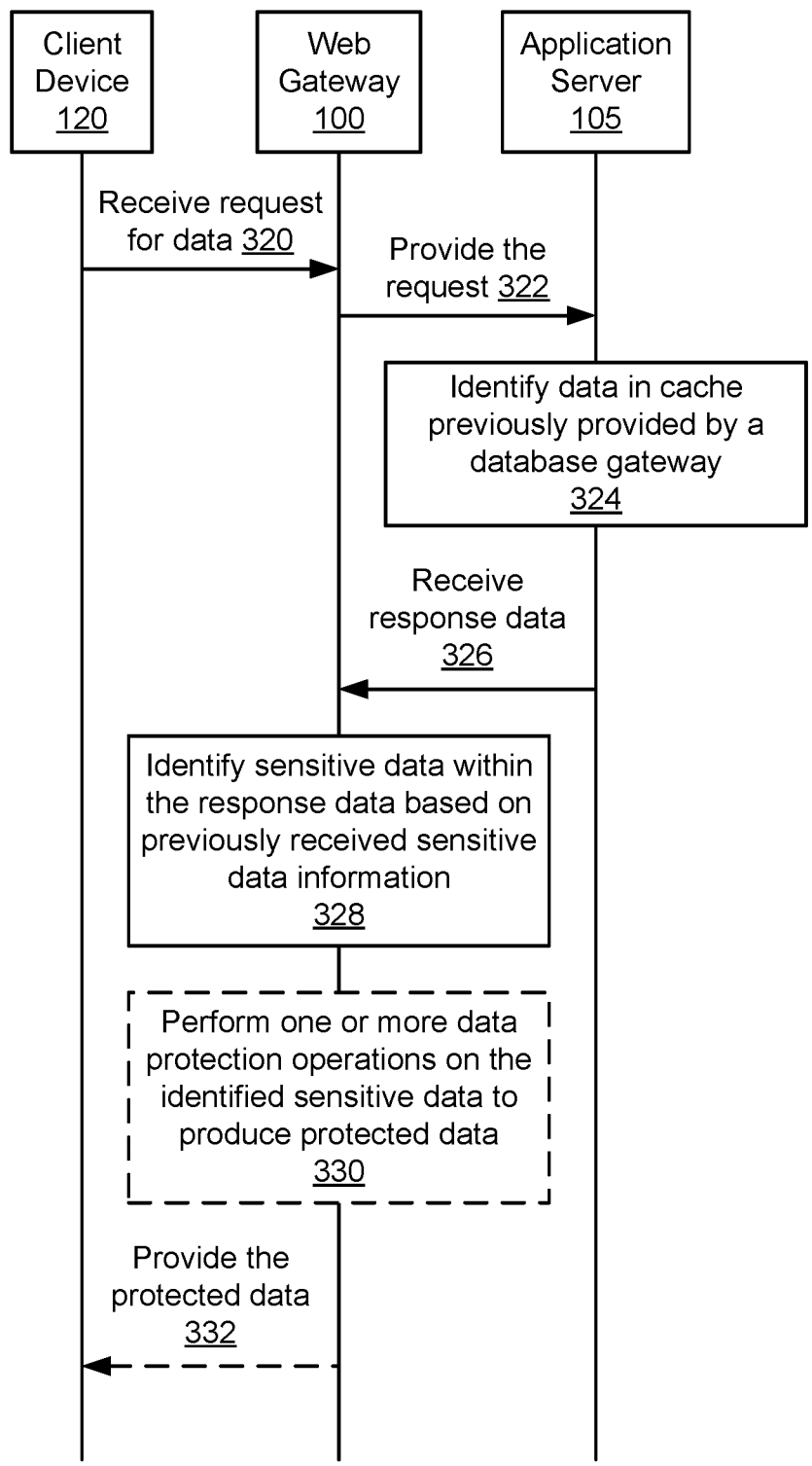
FIG. 3B illustrates another sequence diagram for protecting sensitive data, according to one embodiment.

FIG. 3B illustrates another sequence diagram for protecting sensitive data, according to one embodiment. Responsive to receiving 320 a request for data from the client device 120, the web gateway 100 provides 322 the request to the application server 105. In contrast to the example shown in FIG. 3B, the sequence diagram of FIG. 3A does not include steps for sending a query by the application server 105 to the database 115, outputting the requested data by the database 115, and providing sensitive data information by the database gateway 110. Instead, the web gateway 100 and application server 105 may use previously received and stored information for responding to the request. In particular, the application server 105 identifies 324 cached data previously provided by a database 115. The cached data may include sensitive data (e.g., within prior HTTP responses) or non-sensitive data (e.g., from the application side). The application server 105 may store sensitive data in cache that was received recently, for instance, within the past 30 minutes, hour, or another duration of time.

Continuing in the above example, the web gateway 100 receives 326 response data, which may be based on the sensitive data identified by the application server 105. The web gateway 100 identifies 328 sensitive data within the response data based on previously received sensitive data information from the database gateway 110. The previously received sensitive data information may be saved and retrieved from cache or other memory storage of the web gateway 100. As previously described, the web gateway 100 may perform 330 one or more security/data protection operations on the identified sensitive data to produce protected data. Also, as previously described, the web gateway 100 may provide 332 the protected data to the client device 120 to respond to the request.

While FIG. 3A-3B are described with reference to FIG. 1A, the concepts of FIG. 3A-3B are equally applicable to the system of FIG. 1B. For example, the DAM agent(s) 141, or the DAM agent(s) 141 in combination with one or more of the analysis engine(s) 151, performing 306, 308, and 310; and the analysis engine(s) 151 communicating with the RASP agent(s) 106 to: 1) use the sensitive data information to detect the existence of the sensitive data in responses from the web application (block 314); and 2) perform security/data protection operations accordingly (e.g., block 316 and 318).

Example Process Flow

Figure 4:
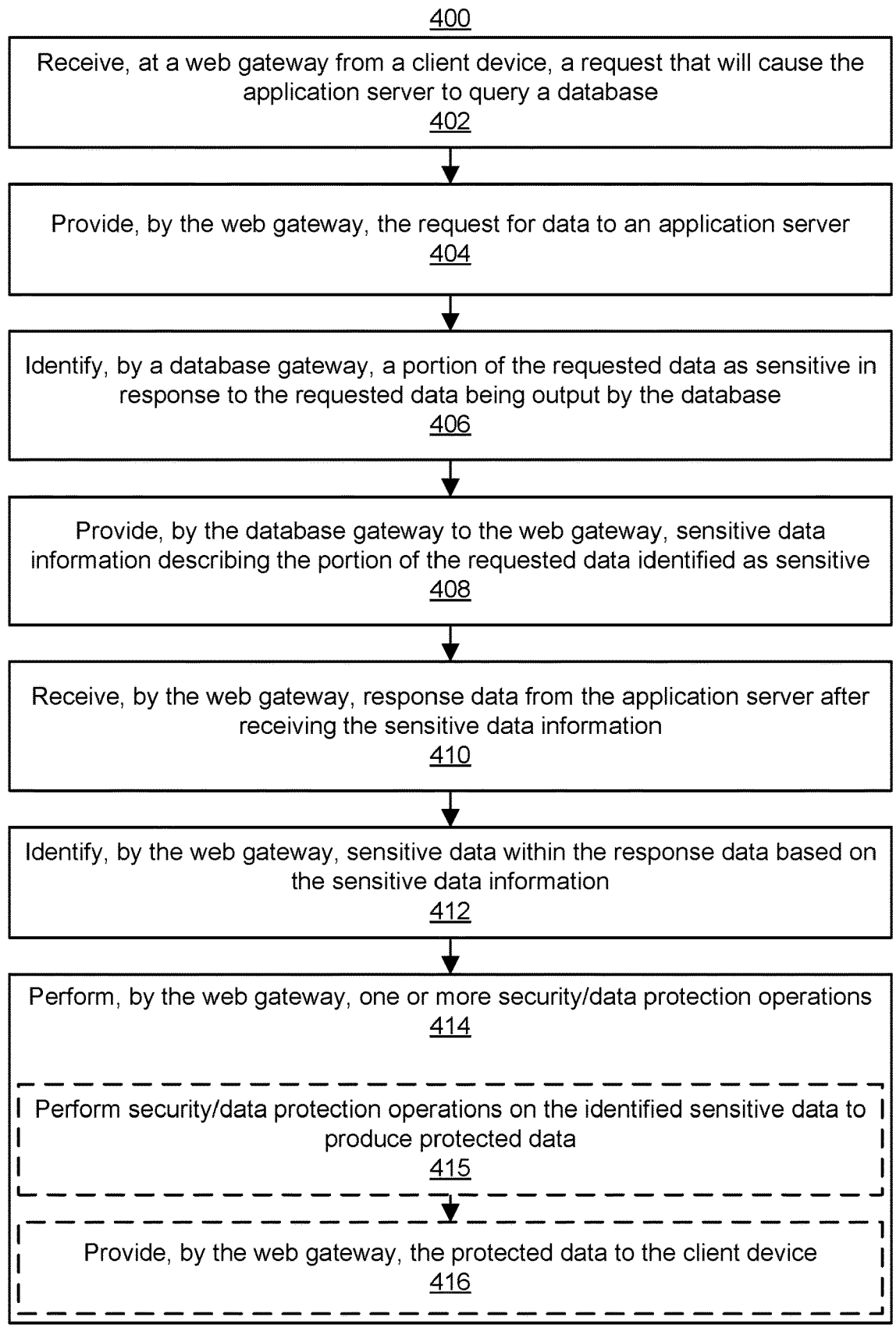
FIG. 4 illustrates a method for protecting sensitive data by a web gateway, according to one embodiment.

FIG. 4 illustrates a method 400 for protecting sensitive data by a web gateway 100, according to one embodiment. The method 400 includes receiving 402, at a web gateway 100 from a client device 120, a request that will cause the application server to query database 115. The web gateway 100 provides 404 the request for data to an application server 105 coupled between the web gateway 100 and the database 115, where the application server 105 is configured to query the database 115 for the requested data. In response to the requested data being output by the database 115 to the application server 105, a database gateway 110 identifies 406 a portion of the requested data as sensitive. The method 400 further includes providing 408, by the database gateway 110 to the web gateway 100, sensitive data information describing the portion of the requested data identified as sensitive.

After receiving the sensitive data information, the web gateway 100 receives 410 response data from the application server 105. The web gateway 100 identifies 412 sensitive data within the response data based on the sensitive data information. The web gateway 100 performs 414 one or more security/data protection operations. For example, block 414 may include the web gateway 100: 1) performing one or more security/data protection operations on the identified sensitive data to produce protected data (block 415); and 2) providing (block 416) the protected data to the client device 120. The web gateway 100 may select the one or more security/data protection operations based on tracked activity of a user of the client device 120. In an embodiment, the web gateway 100 determines a likelihood that the received request from the client device 120 is malicious based on the tracked activity of the user of the client device 120. Responsive to determining that the likelihood is greater than a pre-determined threshold, the web gateway 100 may select a security/data protection operation that filters personally identifiable information from the identified sensitive data.

While FIG. 4 is described with reference to FIG. 1A, the concepts of FIG. 4 are equally applicable to the system of FIG. 1B. For example, the RASP agent(s) 106, or the RASP agent(s) 106 in combination with one or more of the analysis engine(s) 151, performing 402 and 404; the DAM agent(s) 141, or the DAM agent(s) 141 in combination with one or more of the analysis engine(s) 151, performing blocks 406 and 408; and the RASP agent(s) 106, or the RASP agent(s) 106 in combination with one or more of the analysis engine(s) 151, performing blocks 410, 412, 414, 415, and 416.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Any of the devices or systems described herein can be implemented by one or more computing devices. A computing device can include a processor, a memory, a storage device, an I/O interface, and a communication interface, which may be communicatively coupled by way of communication infrastructure. Additional or alternative components may be used in other embodiments. In particular embodiments, a processor includes hardware for executing computer program instructions by retrieving the instructions from an internal register, an internal cache, or other memory or storage device, and decoding and executing them. The memory can be used for storing data or instructions for execution by the processor. The memory can be any suitable storage mechanism, such as RAM, ROM, flash memory, solid state memory, and the like. The storage device can store data or computer instructions, and can include a hard disk drive, flash memory, an optical disc, or any other suitable storage device. The I/O interface allows a user to interact with the computing device, and can include a mouse, keypad, keyboard, touch screen interface, and the like. The communication interface can include hardware, software, or a combination of both, and can provide one or more interfaces for communication with other devices or entities.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for protecting information, the method comprising:
receiving, at a web application firewall (WAF) from a client device, a request for data;
providing, by the WAF, the request for data to an application server coupled between the WAF and a database, the application server configured to query the database for the requested data;
in response to the requested data being output by the database, identifying, by a database activity monitor (DAM) coupled between the database and the WAF, a portion of the requested data output by the database as sensitive, wherein the WAF and DAM are implemented by one or more computing devices;
providing, by the DAM to the WAF, sensitive data information describing the portion of the requested data identified as sensitive, wherein the sensitive data information includes information regarding when the WAF should expect to receive sensitive data from the application server;

after receiving the sensitive data information, receiving, by the WAF, response data from the application server;

identifying, by the WAF, sensitive data within the response data based on the sensitive data information; and performing, by the WAF, one or more security operations based the identifying of sensitive data.

2. The method of claim 1, further comprising:

tracking, by the WAF, activity of a user of the client device including previous requests for data; and selecting, by the WAF, the one or more security operations based on the tracked activity of the user of the client device.

3. The method of claim 2, further comprising:

determining, by the WAF, a likelihood that the received request is malicious based on the tracked activity of the user of the client device; and responsive to determining that the likelihood is greater than a pre-determined threshold, selecting, by the WAF, a security operation that filters personally identifiable information from the identified sensitive data.

4. The method of claim 1, wherein the portion of the requested data is identified as sensitive based on one or more of: metadata of the requested data, information associated with a column or row of the database, a database table of the database in which requested data resides, a format of the requested data, or a user-specified sensitive data parameter.

5. The method of claim 1, wherein the portion of the requested data is identified as sensitive based on one or more of: database metadata found in the query, information that may be associated with the query, and/or pattern matching on the query result.

6. The method of claim 1, further comprising:

determining, by the DAM, a subset of a plaintext representation of the portion of the requested data;

determining, by the DAM, a length of the portion;

determining, by the DAM, a first checksum of the portion; and determining, by the DAM, a first hash of the portion;

wherein the sensitive data information includes at least the subset of the plaintext representation, the length, the first checksum, and the first hash.

7. The method of claim 6, further comprising:

determining, by the WAF, if the subset of the plaintext representation of the portion of the requested data matches a subset of a portion of the response data;

in response to the subset of the plaintext representation of the portion of the requested data matching the subset of the portion of the response data, determining, by the WAF, a second checksum of the portion of the response data according to the length;

in response to the first checksum matching the second checksum, generating, by the WAF, a second hash of the portion of the response data according to the length of the requested data; and in response to the first hash matching the second hash, identifying, by the WAF, the portion of the response data as the sensitive data within the response data.

8. The method of claim 1, wherein the requested data output by the database is structured data, the method further comprising:

parsing, by the WAF, unstructured markup language data of the response data from the application server to identify the sensitive data.

9. The method of claim 1, wherein the DAM, WAF, and application server comprise distinct, different computing devices.

10. The method of claim 1, wherein the performing includes:

performing one or more security operations on the identified sensitive data to produce protected data; and providing the protected data to the client device.

11. The method of claim 1, wherein the one or more security operations comprises flagging the identified sensitive data for review by personnel associated with the WAF.

12. The method of claim 1, wherein the one or more security operations are configurable by an entity associated with the WAF.

13. A method for protecting information, the method comprising:

receiving, at a WAF from a client device, a request for data;

providing, by the WAF, the request for data to an application server coupled between the WAF and a database, the application server configured to query the database for the requested data;

receiving, at the WAF, sensitive data information from a DAM, the DAM coupled between the database and the WAF, the sensitive data information describing a portion of the requested data identified as sensitive by the DAM, wherein the sensitive data information includes information regarding when the WAF should expect to receive sensitive data from the application server, wherein the WAF and DAM are implemented by one or more computing devices;

after receiving the sensitive data information, receiving, by the WAF, response data from the application server;

identifying, by the WAF, sensitive data within the response data based on the sensitive data information; and performing, by the WAF, one or more security operations based on the identified sensitive data.

14. The method of claim 13, further comprising:

tracking, by the WAF, activity of a user of the client device including previous requests for data; and selecting, by the WAF, the one or more security operations based on the tracked activity of the user of the client device.

15. The method of claim 14, further comprising:

determining, by the WAF, a likelihood that the received request is malicious based on the tracked activity of the user of the client device; and responsive to determining that the likelihood is greater than a pre-determined threshold, selecting, by the WAF, a security operation that filters personally identifiable information from the identified sensitive data.

16. The method of claim 13, wherein the sensitive data information includes at least (i) a subset of a plaintext representation of the portion of the requested data, (ii) a length of the portion of the requested data, and one or both of (iii) a first checksum of the portion of the requested data, and (iv) a first hash of the portion of the requested data.

17. The method of claim 16, further comprising:

determining, by the WAF, if the subset of the plaintext representation of the portion of the requested data matches a subset of a portion of the response data;

in response to the subset of the plaintext representation of the portion of the requested data matching the subset of the portion of the response data, determining, by the WAF, a second checksum of the portion of the response data according to the length;

in response to the first checksum matching the second checksum, generating, by the WAF, a second hash of the portion of the response data according to the length; and in response to the first hash matching the second hash, identifying, by the WAF, the portion of the response data as the sensitive data within the response data.

18. The method of claim 13, wherein the requested data is structured data, the method further comprising:
parsing, by the WAF, unstructured markup language data of the response data from the application server to identify the sensitive data.

19. The method of claim 13, wherein the DAM, WAF, and application server comprise distinct, different computing devices.

20. A computer program product comprising a non-transitory computer readable storage medium having instructions encoded thereon that, when executed by a processor, cause a WAF to:
provide a request for data received from a client device to an application server coupled between the WAF and a database, the application server configured to query the database responsive to the request;
identify whether sensitive data is within response data received from the application server based on sensitive data information received from a DAM, wherein the DAM is coupled between the database and the WAF, wherein the sensitive data information describes data that is sent to the application server responsive to the request and that is identified as sensitive by the DAM, wherein the sensitive data information includes information regarding when the WAF should expect to receive sensitive data from the application server, wherein the WAF and DAM are implemented by one or more computing devices; and
perform one or more security operations when sensitive data is identified within the response data.

21. The computer program product of claim 20, wherein the non-transitory computer readable storage medium further has instructions encoded thereon that, when executed by the processor, cause the WAF to:
track activity of a user of the client device including previous requests for data; and
select the one or more security operations based on the tracked activity of the user of the client device.

22. The computer program product of claim 20, wherein the non-transitory computer readable storage medium further has instructions encoded thereon that, when executed by the processor, cause the WAF to:
determine a likelihood that the received request is malicious based on the tracked activity of the user of the client device; and
responsive to determining that the likelihood is greater than a pre-determined threshold, select a security operation that filters personally identifiable information from the identified sensitive data.

23. The computer program product of claim 20, wherein the sensitive data information includes at least (i) a subset of a plaintext representation of a portion of data sent from the database to the application server, (ii) a length of the portion, one or both of (iii) a first checksum of the portion and (iv) a first hash of the portion, and wherein the non-transitory computer readable storage medium further has instructions encoded thereon that, when executed by the processor, cause the WAF to:

determine if the subset of the plaintext representation of the portion of the data matches a subset of a portion of the response data;
in response to the subset of the plaintext representation of the portion of the requested data matching the portion of the response data, determine a second checksum or a second hash of the portion of the response data according to the length; and
in response to the first hash matching the second hash or the first checksum matching the second checksum, identify the portion of the response data as the sensitive data within the response data.

24. The computer program product of claim 20, wherein the DAM, WAF, and application server comprise distinct, different computing devices.

25. A method for protecting information from databases, the method comprising:
identifying, by a DAM coupled between a database and a WAF, requested data output by the database responsive to a request from a client device, the request provided from the WAF to an application server, wherein the WAF and DAM are implemented by one or more computing devices;
identifying, by the DAM, a portion of the requested data as sensitive;
determining, by the DAM, sensitive data information describing the portion of the requested data identified as sensitive wherein the sensitive data information includes information regarding when the WAF should expect to receive sensitive data from the application server; and
providing, by the DAM to the WAF, the sensitive data information, to cause the WAF to identify sensitive data within response data from the application server based on the sensitive data information and to perform one or more security operations selected based on the identified sensitive data.

26. The method of claim 25, further comprising:
determining, by the DAM, a subset of a plaintext representation of the portion of the requested data;
determining, by the DAM, a length of the portion of the requested data;
determining, by the DAM, a checksum and/or a hash of the portion of the requested data; and
wherein the sensitive data information includes at least the subset of the plaintext representation, the length, and one or both of the checksum and the hash.

27. The method of claim 25, wherein the portion of the requested data is identified as sensitive based on one or more of: metadata of the requested data, information associated with a column or row of the database, a database table of the database in which requested data resides, a format of the requested data, or a user-specified sensitive data parameter.

28. The method of claim 25, wherein the portion of the requested data is identified as sensitive based on one or more of: database metadata found in the query, information that may be associated with the query, and/or pattern matching on the query result.

29. The method of claim 25, wherein the WAF tracks activity of a user of the client device including previous requests for data, and the one or more security operations are selected based on the tracked activity of the user of the client device.

30. The method of claim 25, wherein the DAM, WAF, and application server comprise distinct, different computing devices.

* * * * *